United States Patent [19]
Umezawa

[11] Patent Number: 5,036,387
[45] Date of Patent: Jul. 30, 1991

[54] COLOR TELEVISION RECEIVER

[75] Inventor: Toshimitsu Umezawa, Saitama, Japan

[73] Assignee: Kabushiki Kaisha Toshiba, Kawasaki, Japan

[21] Appl. No.: 483,265

[22] Filed: Feb. 15, 1990

Related U.S. Application Data

[63] Continuation of Ser. No. 16,960, Feb. 20, 1987, abandoned, which is a continuation of Ser. No. 628,984, Jul. 9, 1984, abandoned.

[30] Foreign Application Priority Data

Jul. 11, 1983 [JP] Japan ................. 58-124607

[51] Int. Cl.$^5$ .................................... H04N 9/73
[52] U.S. Cl. .................................... 358/29
[58] Field of Search .............. 358/10, 21 V, 29, 243, 358/168, 34, 39, 65, 74, 170, 171

[56] References Cited

U.S. PATENT DOCUMENTS

| | | | |
|---|---|---|---|
| 3,767,854 | 10/1973 | Stark, Jr. et al. | 358/74 |
| 3,924,067 | 12/1975 | Arneson | 358/243 |
| 4,200,882 | 4/1980 | Janssen | 358/29 |
| 4,356,508 | 10/1982 | Okada | 358/29 |
| 4,450,476 | 5/1984 | Tallant, II | 358/74 |
| 4,516,152 | 5/1985 | Willis | 358/29 |
| 4,587,566 | 5/1986 | Hinn | 358/65 |
| 4,692,793 | 9/1987 | Tamura et al. | 358/74 |

FOREIGN PATENT DOCUMENTS 0159088  9/1983  Japan .
2070398B 12/1983  United Kingdom .

Primary Examiner—John W. Shepperd
Attorney, Agent, or Firm—Cushman, Darby & Cushman

[57] ABSTRACT

A color television receiver having an automatic white control circuit which includes a detection circuit for detecting whether or not a given magnitude of a cathode current of a CRT flows, and generating a detection signal when the cathode current exceeds the given magnitude; and an interruption circuit for interrupting the supply of a video signal to the CRT until a given period of time has elapsed after the generation of the detection signal. The heat-up of the cathode of CRT is detected by the generation of the detection signal. The interruption circuit makes the CRT free from the video signal for the given period of time after the heat-up, so that no raster with maximum brightness appears after the power-on of the television receiver.

9 Claims, 7 Drawing Sheets

COLOR TELEVISION RECEIVER

This is a continuation of application Ser. No. 07/016,960, filed Feb. 20, 1987, which was abandoned upon the filing hereof which is a continuation of application Ser. No. 06/628,984 now abandoned.

BACKGROUND OF THE INVENTION

The present invention relates to an improvement of a color television receiver having an automatic white control circuit.

In a conventional color television receiver of an NTSC television system, a reference white color temperature of a CRT is set to be 6,774 K, for example. The reference white of the color temperature is the basis for color reproduction. Deviation between the CRT reference white color temperature and the color temperature of 6,774 K results in a color misregistration between the original color of a photographed object and the color reproduced by the television receiver. Therefore, the reference white must be accurately maintained at a predetermined value.

A color CRT of the color television receiver is driven by red (R), green (G) and blue (B) signal components extracted from a composite color television signal. The CRT drive levels at the R, G and B electron guns in response to the R, G and B signal components must be accurately set at predetermined levels in order to determine reference white. When the drive biases of the respective electron guns deviate from prescribed values, an adverse effect such as a cutoff error (deviation in cutoff level) of the color CRT occurs. The cutoff error is caused by a deteriotation in electron emission of the CRT cathode due to aging and/or caused by a drift of the operating point of associated circuitries. Accordingly, a color television receiver is generally provided with a means for adjusting the bias of the CRT in order to eliminate disadvantages due to the cutoff error.

The above bias adjusting means conventionally includes an electronic circuit with a service switch. The service switch has two switching positions. One is a "service position" and the other is a "normal position". When the service switch selects the service position, the CRT is off-circuited from a video signal and the vertical scanning is stopped. In this state, each cutoff voltage of electron guns of the CRT is set at a given value by adjusting each bias of the electron guns. Then, the CRT is properly cut off at the black level of the video signal, and the relative amplitude ratio among chrominance signals throughout the entire luminance level is properly maintained. When the bias adjustment is completed, gains of CRT drivers coupled to the respective electron guns are adjusted to predetermined values. As a result, the amplitude ratio among the R, G and B drive signals in the normal operation of the CRT becomes optimal.

The above-mentioned adjustment requires skill and experience. It is quite hard for general users to complete the above adjustment at home. When the color television receivers are used for a long period of time, the reference white becomes deviated from the prescribed value, resulting in unnatural color reproduction.

An automatic white control circuit has been recently proposed to automatically adjust the reference white even if a deterioration in the CRT cathode emission and an operating point drift in the associated circuitries occur. A typical example of such a white control circuit is shown in FIG. 1.

Referring to FIG. 1, a reference numeral 10 denotes an antenna. A television signal caught by antenna 10 is fed to a television signal processing circuit 11. Circuit 11 is generally formed of a tuner, PIF circuit, video detector, amplifier, chrominance/luminance separator, sync separator, etc. Color difference signals E11R, E11G and E11B for R-Y, G-Y and B-Y respectively appear at output terminals 11R, 11G and 11B of circuit 11. Signals E11R, E11G and E11B are supplied to matrix circuits 12R, 12G and 12G, respectively.

A video signal E11Y including a luminance signal -Y which appears at an output terminal 11Y of circuit 11. Signal E11Y is supplied via a mixer 13 to matrix circuits 12R, 12G and 12B. In circuits 12R, 12G and 12B, luminance signal -Y is mixed with color difference signals E11R, E11G and E11B (R-Y, G-Y and B-Y) to produce chrominance signals E12R, E12G and E12B for R, G and B, respectively.

A blanking signal E11S containing blanking pulses BLK appears at an output terminal 11S of circuit 11. Signal E11S is supplied to a pulse separator 14. In separator 14, blanking pulses BLK are separated into a vertical blanking pulse E14V and horizontal blanking pulse E14H. Vertical and horizontal blanking pulses E14V and E14H are supplied to vertical and horizontal blanking pulse shapers 15 and 16, respectively. Shaper 15 supplies a signal E15 containing a wave-shaped vertical blanking pulse VB to a signal generator 17. Shaper 16 supplies a signal E16 containing a wave-shaped horizontal blanking pulse HB to generator 17.

A reference insertion pulse E17A appears at an output terminal 17A of generator 17. Pulse E17A is supplied to mixer 13. In mixer 13, pulse E17A is inserted in a given part, excluding a picture signal interval, of one horizontal period of video signal E11Y. The inserted reference insertion pulse E17A is supplied, together with luminance signal -Y, to matrix circuits 12R, 12G and 12B.

Chrominance signals E12R, E12G and E12B outputted from matrix circuits 12R, 12G and 12B are supplied to cathodes 21R, 21G and 21B of a color CRT 21 via level correction circuits 18R, 18G and 18B, CRT drivers 19R, 19G and 19B, and output circuits 20R, 20G and 20B, respectively. DC levels of output signals E18R, E18G and E18B from circuits 18R, 18G and 18B are increased or decreased according to DC control voltages E35R, E35G and E35B. These voltages E35R, E35G and E35B are respectively supplied to control terminals 22, 23 and 24 of circuits 18R, 18G and 18B.

Hereinafter, CRT drivers 19R, 19G and 19B are represented schematically by CRT driver 19B. CRT driver 19B is formed of an NPN transistor 25. The base of transistor 25 receives signal E18B from level correction circuit 18B. The collector of transistor 25 is coupled via a resistor 26 to a positive voltage source Vcc, and the emitter thereof is circuit-grounded via a resistor 27. An output signal E19B from the collector of transistor 25 is supplied to output circuit 20B. The circuit arrangement of CRT drivers 19R and 19G may be the same as that of CRT driver 19B.

Output circuits 20R, 20G and 20B are similarly represented by output circuit 20B. Output circuit 20B includes a PNP transistor 28 whose base receives a signal E19B from the collector of transistor 25. The collector of transistor 28 is circuit-grounded via a resistor 29, and the emitter thereof is connected to cathode 21B of CRT 21. When the current amplification factor $h_{FE}$ of transistor 28 is far larger than "1", a cathode current I21B flowing from cathode 21B into the emitter of transistor 28 is substantially the same as the collector current of transistor 28. In this case, the voltage drop across resistor 29 directly corresponds to the cathode current I21B. Thus, resistor 29 serves as a current detecting resistor. The arrangement of circuits 20R and 20G may be the same as that of circuit 20B.

A signal E20B corresponding to the voltage drop at resistor 29 is supplied to a sampling circuit 33B. Signals E20R and E20G being proportional to cathode currents I21R and I21G of CRT 21 are similarly supplied from circuits 20R and 20G to sampling circuits 33R and 33G, respectively. Circuits 33R, 33G and 33B may be conventional sample/hold circuits. Each of sampling circuits 33R, 33G and 33B receives a gate pulse E17B obtained from an output terminal 17B of signal generator 17. Gate pulse E17B is generated in synchronism with the generation timing of reference insertion pulse E17A (a detailed description regarding the generation timing of E17A and E17B will be made later with reference to the timing chart of FIGS. 2A to 2E).

Sampling circuit 33R samples the DC potential of signal E20R at the duration of reference insertion pulse E17A, and holds the sampled potential to provide a sampling output signal E33R. Sampling circuit 33G samples the DC potential of signal E20G at the duration of pulse E17A, and holds the sampled potential to provide a sampling output signal E33G. Sampling circuit 33B samples the DC potential of signal E20B at the duration of pulse E17A, and holds the sampled potential to provide a sampling output signal E33B.

Sampling output signals E33R, E33G and E33B are supplied to respective negative inputs (−) of comparators 35R, 35G and 35B. Each positive input (+) of comparators 35R, 35G and 35B receives a reference potential E1 from a reference potential source 36. Comparators 35R, 35G and 35B respectively supply DC control voltages E35R, E35G and E35B to control terminals 22, 23 and 24 of level correction circuits 18R, 18G and 18B. Then, three independent negative feedback control loops for R, G and B are formed. DC control voltages E35R, E35G and E35B from comparators 35R, 35G and 35B increase when the potentials of sampling output signals E33R, E33G and E33B become lower than reference potential E1. Voltages E35R, E35G and E35B decrease when the potentials of signals E33R, E33G and E33B become higher than reference potential E1. DC control voltages E35R, E35G and E35B are converged to certain values by the DC negative feedback operation when the differences between the reference potential E1 and the respective potentials of signals E33R, E33G and E33B become zero.

Incidentally, a high voltage is applied to the anode of CRT 21 via an anode cap 40. Horizontal and vertical deflection currents are supplied via terminals 42 and 43 to a deflection coil 41. Other non-essential parts for the present invention, such as an audio circuit etc., are not illustrated.

The automatic white control circuit of FIG. 1 will operate as follows.

FIG. 2A shows a typical waveform of video signal E11Y from terminal 11Y of television signal processing circuit 11. In FIG. 2A, reference symbol VB denotes a vertical blanking pulse; HB denotes a horizontal blanking pulse; and L denotes a picture signal. FIG. 2B shows a waveform of signal E15 from vertical blanking pulse shaper 15, and FIG. 2C shows a waveform of signal E16 from horizontal blanking pulse shaper 16. Blanking pulses VB and HB shown in FIGS. 2B and 2C are supplied to signal generator 17. Reference insertion pulse E17A shown in FIG. 2D appears at output terminal 17A of signal generator 17. Pulse E17A is generated, excluding the period of picture signal L, within an interval (T1) of horizontal blanking pulse HB. Pulse E17A can be easily obtained by a conventional counter circuit with a proper gate circuit. Pulse E17A (FIG. 2D) is mixed in mixer 13 with video signal E11Y (FIG. 2A), so that a composite signal E13 (FIG. 2E) is obtained. Composite signal E13 is supplied to the respective cathodes of CRT 21 via circuit elements 12, 18, 19 and 20.

In the following description, the operation regarding the blue circuit elements represents each operation of the red, green and blue circuit elements.

Cathode current I21B from cathode 21B of CRT 21 flows into resistor 29 through the emitter-collector path of transistor 28. Resistor 29 provides a voltage drop corresponding to the magnitude of cathode current I21B, and signal E20B having a potential corresponding to the above voltage drop appears at the node between resistor 29 and the collector of transistor 28. Signal E20B is then supplied to sampling circuit 33B. Circuit 33B receives gate pulse E17B in synchronism with the generation (period T1) of reference insertion pulse E17A. Gate pulse E17B determines the timing of sampling and holding operations in circuit 33B. Sampling circuit 33B samples the potential of signal E20B and holds the sampled potential in a capacitor Cb. The sampled and held signal E33B is supplied to the negative input (−) of comparator 35B.

Comparator 35B has a characteristic as shown in FIG. 3. When the reference potential applied to the positive input (+) of comparator 35B is given to be E1 and the input and output potentials of comparator 35B are respectively plotted along the abscissa and ordinate, the output potential (E35B) decreases as the input potential (E33B) increases.

Level correction circuit 18B has such an electrical characteristic that the output DC level of signal E18B raises when DC control voltage E35B applied to control terminal 24 increases, while the output DC level of E18B falls when E35B decreases.

When the emission of cathode 21B is deteriorated (or a certain drift in the operating point of associated circuitries occurs), the corresponding cathode current I21B flowing into resistor 29 of circuit 20B becomes small. The potential of signal E33B from sampling circuit 33B is proportional to the magnitude of cathode current I21B which is obtained at the period of reference insertion pulse E17A (FIG. 2D). Since the sampling is performed only during the period T1 of reference insertion pulse E17A, the potential of signal E33B is independent of the period of picture signal L. Thus, when the deterioration of cathode emission occurs, the sampled output E33B is decreased regardless of the presence of any picture signal L.

Comparator 35B compares reference potential E1 with the potential of sampled output E33B. When a deterioration of the cathode emission occurs, comparator 35B generates DC control voltage E35B which is increased in accordance with the characteristic of FIG. 3. Then, the DC level of signal E18B from level correction circuit 18B is increased, thereby increasing the corresponding cathode current I21B.

On the contrary, when the cathode current increases, operation opposite to the operation described above is performed so as to decrease the corresponding cathode current. The increase/decrease operation point of the negative feedback control is stably converged to a point at which the difference between the reference potential E1 and the sampled output E33B becomes zero.

The cathode emission correction operation for R and G components may be performed in the same manner as that for the B component as described above. When the negative feedback control circuit is arranged to set the difference between the reference potential (E1) and the sampled output (E33) to be zero while the initial reference white is properly adjusted, the CRT biases for R, G, and B are automatically adjusted even if a deterioration in the cathode emission of CRT or a drift in the operating point of associated circuitries occurs. As a result, an automatic correction is so performed that the reference white is always maintained at a predetermined value.

In a color television receiver having the automatic white control circuit described above, no problem occurs in normal operation. However, when the power of a color television receiver has been switched off for a long period of time, the temperature at each cathode of a CRT is substantially the same as room temperature. When the power of a color television receiver is switched on under this condition, a certain period of time (generally several seconds) is required to heat-up the CRT cathode. Unless the CRT cathode is heated up to a sufficient temperature, no cathode emission is obtained and no cathode current flows. As is apparent from the negative feedback operation described before, when no cathode current flows, each potential of outputs from sampling circuits 33R, 33G and 33B becomes minimum. For this reason, the outputs from comparators 35R, 35G and 35B and hence the output DC levels of level correction circuits 18R, 18G and 18B are increased, so that the drive voltage for each cathode of the CRT is fixed at the saturation level of the CRT drive circuits. (In this condition, each cathode potential of the CRT is minimum so as to increase the cathode current because each of the negative feedback loops detects no cathode current.) Under this condition, when each cathode temperature rises over a certain value, each cathode current begins to flow. Then, the drive voltage for the CRT cathode begins to decrease and is converged to a certain given value.

When the power of the above color television receiver is switched on with cool CRT cathodes, a picture is reproduced under the minimum cathode potential so that the raster of CRT always appears with the maximum brightness at the initial period of power-on, thereby shortening the life of CRT, causing deviations in reference white, and discomforting viewers. This is the problem to be solved by the present invention.

SUMMARY OF THE INVENTION

It is accordingly the object of the present invention to provide a color television receiver which avoids the above problem.

To achieve the above object a color television receiver having an automatic white control circuit includes:
(a) a detection circuit for detecting whether or not a given magnitude of a cathode current of a CRT flows, and generating a detection signal when the cathode current exceeding the given magnitude flows; and
(b) an interruption circuit for interrupting the supply of a video signal to the CRT until a given period of time has elapsed after the generation of the detection signal.

According to the above color television receiver, the initial point of heat-up of the cathode is detected by the generation of the detection signal. Since the interruption circuit makes the CRT free from the video signal for a given period of time after the initial point of heat-up, no raster with maximum brightness appears after the power-on of the television receiver, thereby avoiding the said problem.

DETAILED DESCRIPTION OF THE PREFERRED EMBODIMENTS

Figure 1:
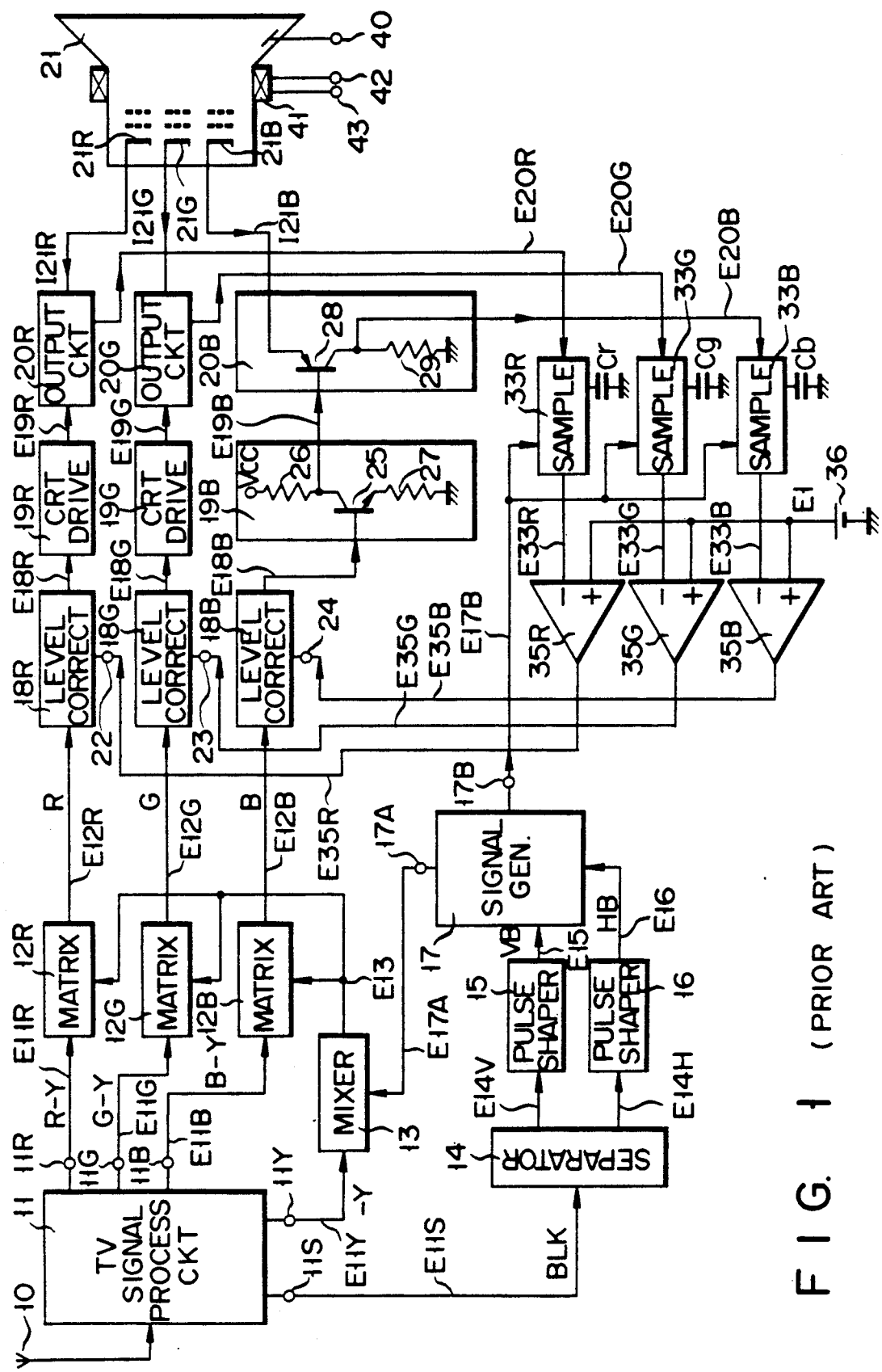
FIG. 1 shows a conventional color television receiver having an automatic white control circuit.
Figure 2:
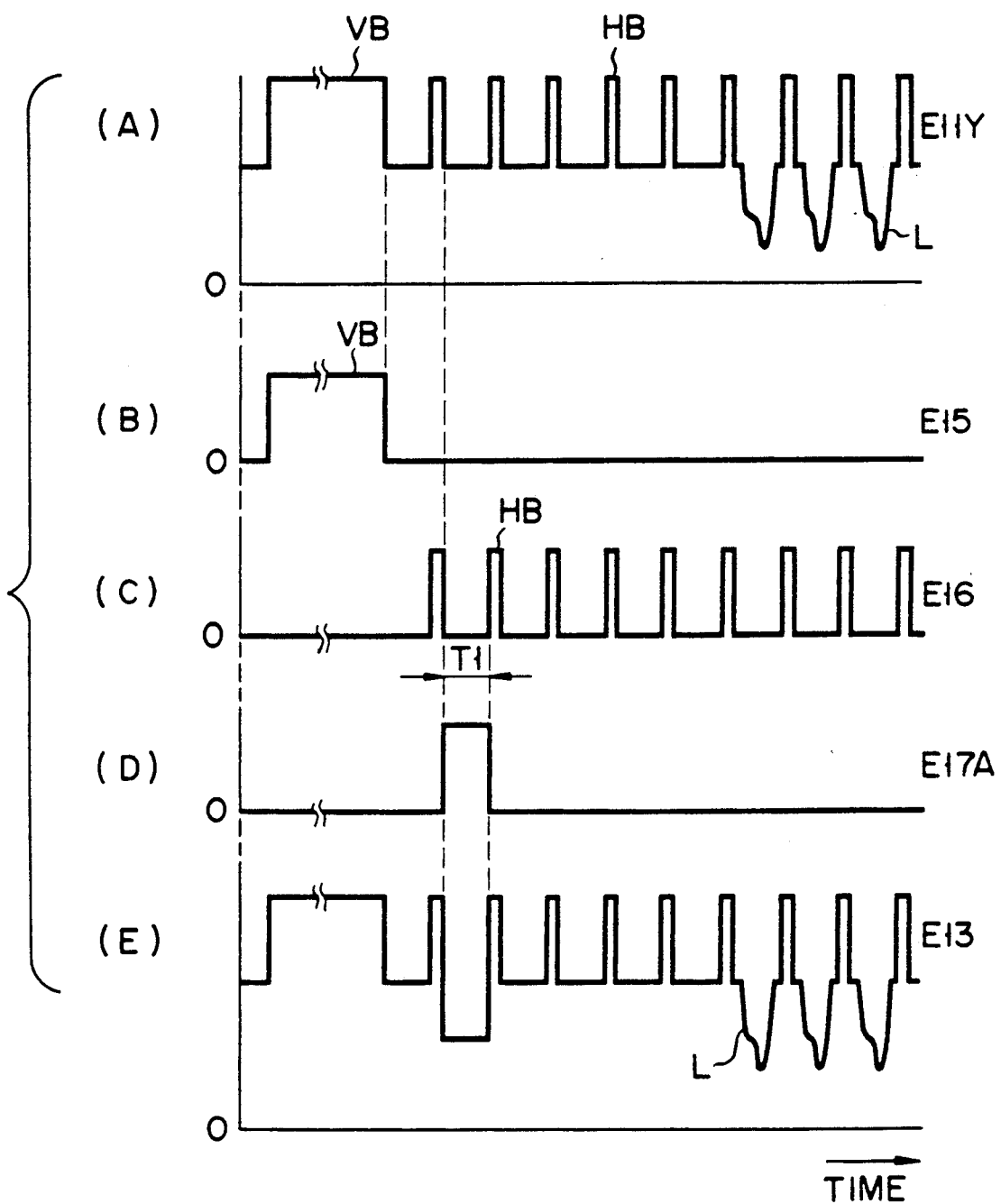
FIG. 2 are timing charts showing signals generated from the circuit components of FIG. 1.
Figure 3:
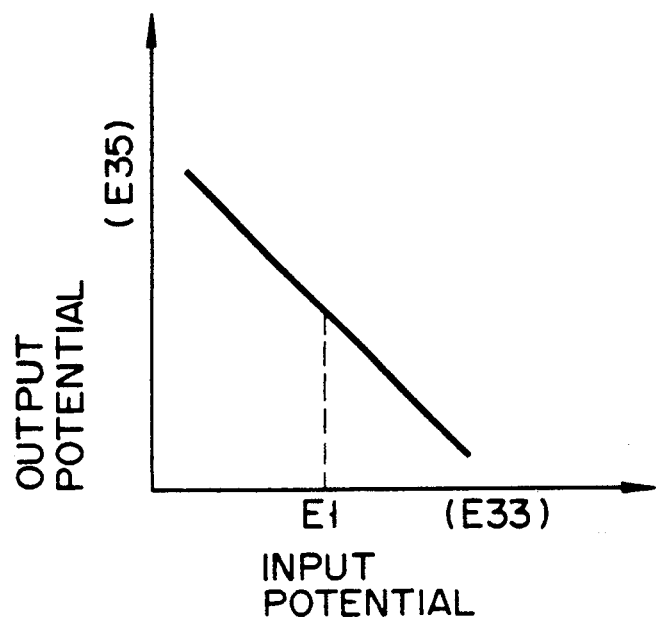
FIG. 3 shows an operation characteristic of each comparator used in the circuit of FIG. 1.
Figure 4:
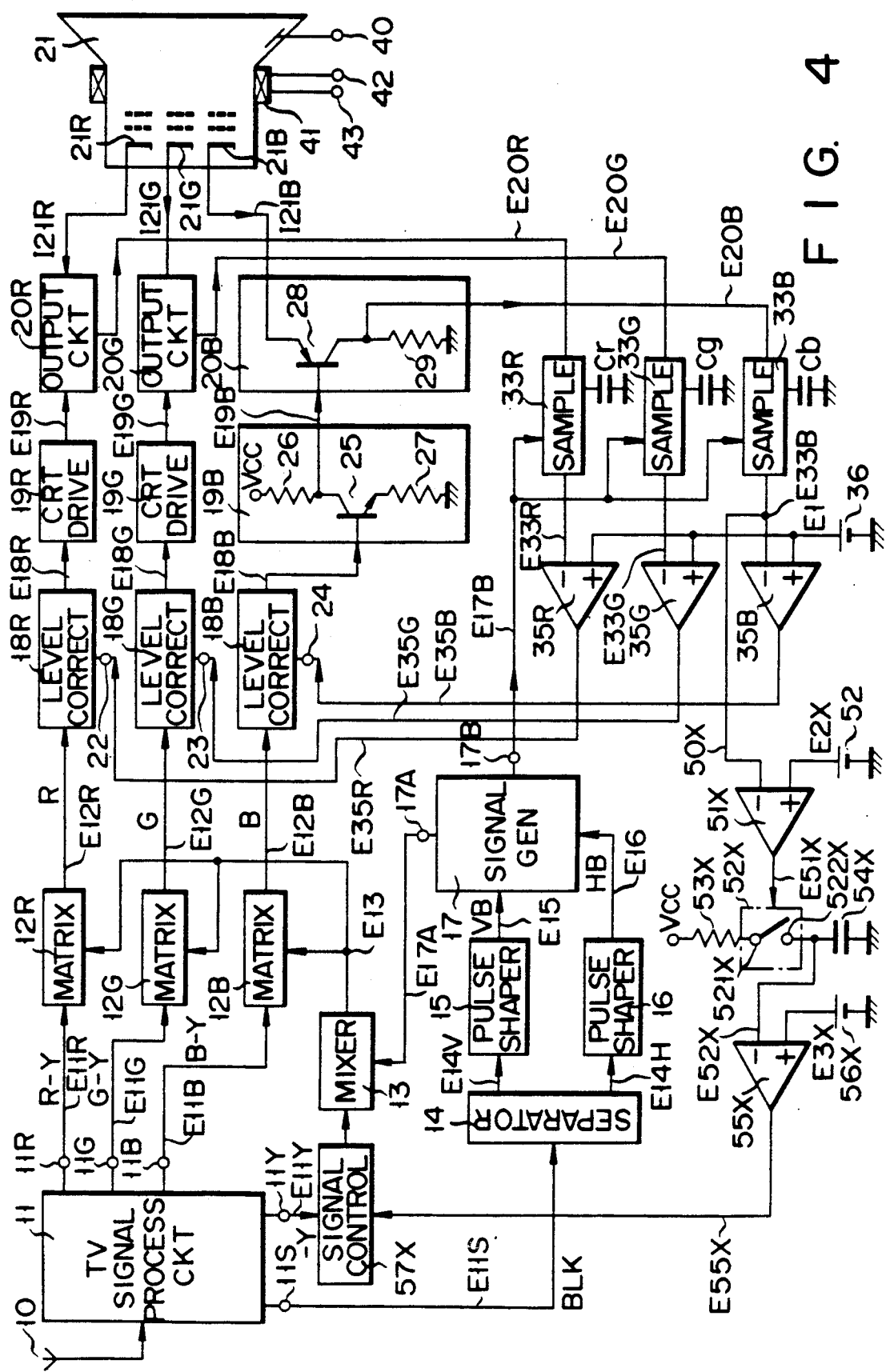
FIG. 4 shows a color television receiver according to an embodiment of the present invention.

A color television receiver according to an embodiment of the present invention will be described with reference to FIGS. 4 to 8. FIG. 4 is a block diagram of the color television receiver. The same reference numerals used in FIG. 4 denote the same elements as in FIG. 1, and a detailed description thereof will be omitted for the sake of simplicity.

The following description will be given chiefly to the key portion of the present invention. Although any output of sampling circuits 33R, 33B and 33G may be used, a sampled output E33B from sampling circuit 33B is used in the present embodiment. Output E33B is supplied to the negative input (−) of a comparator 51X through a signal line 50X. The positive input (+) of comparator 51X receives a current reference potential E2X from a potential source 52. Comparator 51X compares the potential of output E33B with current reference potential E2X. When the potential of output E33B is less than potential E2X, comparator 51X supplies a detection signal E51X to a switch circuit 52X. One terminal 521X of switch circuit 52X is coupled via a resistor 53X to a positive voltage source Vcc, and the other terminal 522X thereof is circuit-grounded via a capacitor 54X.

The charged voltage of capacitor 54X is supplied as a delay signal E52X to the negative input (−) of a comparator 55X. The positive input (+) of comparator 55X receives a time reference potential E3X from a potential (or voltage) source 56X. Comparator 55X compares the potential of delay signal E52X with time reference potential E3X. When the potential of signal E52X is less than potential E3X, comparator 55X supplies a muting signal E55X to a signal control circuit 57X. Signal control circuit 57X may be a conventional muting circuit or analog switch circuit. Signal control circuit 57X is arranged between the output terminal 11Y of television signal processing circuit 11 and the mixer 13 and is controlled in response to the potential of muting signal E55X.

When the charged voltage of capacitor 54X or the potential of delay signal E52X is lower than reference potential E3X, muting signal E55X has a high level so that signal control circuit 57X interrupts the supply of video signal E11Y from circuit 11 to mixer 13. When the potential of delay signal E52X is higher than reference potential E3X, muting signal E55X has a low level so that signal control circuit 57X enables the supply of video signal E11Y from circuit 11 to mixer 13.

The circuit of FIG. 4 operates as follows. In the following description, the timing chart of FIGS. 6A to 6E is referred to. Immediately after the power-on of the television receiver, no cathode current (I21B) flows (t0 in FIG. 6A) because the cathode of CRT 21 is not yet heated-up, and the potential of output E33B from sampling circuit 33B is low (t0 in FIG. 6B). From this, the potential of detection signal E51X from comparator 51X is high (t0 in FIG. 6C) so that switch circuit 52X is opened. Then, the potential of delay signal E52X is almost zero (t0 in FIG. 6D) because capacitor 54X is not yet charged by Vcc through resistor 53X. Since the potential of delay signal E52X is low (t0 in FIG. 6D), the potential of muting signal E55X from comparator 55X is high (t0 in FIG. 6E). In this case, signal control circuit 57X does not supply video signal E11Y appearing at output terminal 11Y to the next circuitry. Then, the signal component of video signal E11Y is not supplied to CRT 21, and the cathode drive voltage of CRT 21 corresponding to video signal E11Y is set to be zero. In this manner, at the time when the power of the television receiver is switched on, CRT 21 is set in the mute mode.

After the power-on, the cathode of CRT 21 is heated, and the cathode temperature increases. Then, the cathode current starts to flow and the potential of output E33B from sampling circuit 33B is increased (t1 in FIG. 6B). When the sampled output E33B exceeds reference potential E2X (t2 in FIG. 6B), the potential of detection signal E51X from comparator 51X falls to zero (t2 in FIG. 6C) so that switch circuit 52X is closed or turned-on. Then, the charging for capacitor 54X starts (t2 in FIG. 6D). When the charging voltage of capacitor 54X or the potential of delay signal E52X exceeds reference potential E3X (t4 in FIG. 6D), the potential of muting signal E55X from comparator 55X falls to zero (t4 in FIG. 6E). Then, signal control circuit 57 ceases the signal interruption, and video signal E11Y from processing circuit 11 is supplied via mixer 13 to the cathode circuit of CRT 21. In this case, the color television receiver is operated in the normal mode, so that automatic adjustment of the CRT bias is performed by the automatic white control circuit.

The time interval from t0 to t1 in FIG. 6A may depend on the actual cathode temperature of CRT 21 or on the condition of CRT 21 when the power of the television receiver is switched on after the power-off. Therefore, this time interval cannot be fixed at a specific value. However, the initial condition of the circuit operation of elements 51X to 57X in FIG. 4 is specified only by the actual cathode current (I21B in FIG. 6A) of CRT 21. Accordingly, the circuit operation of elements 51X to 57X is free from the above uncertain time interval (t0 to t1). This is an important feature of the present invention.

Figure 5:
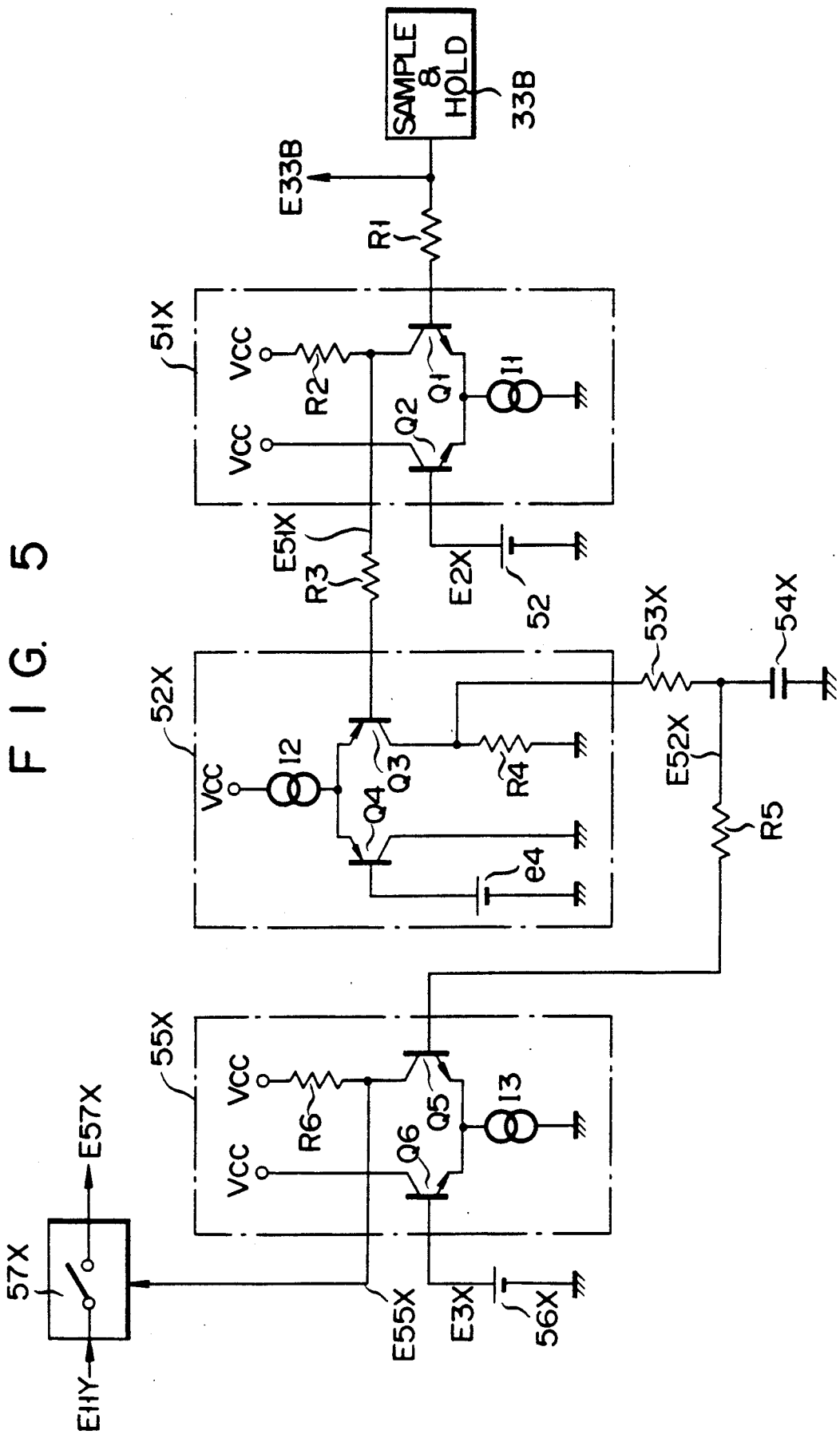
FIG. 5 is a circuit diagram showing the main part of the configuration of FIG. 4.
Figure 6:
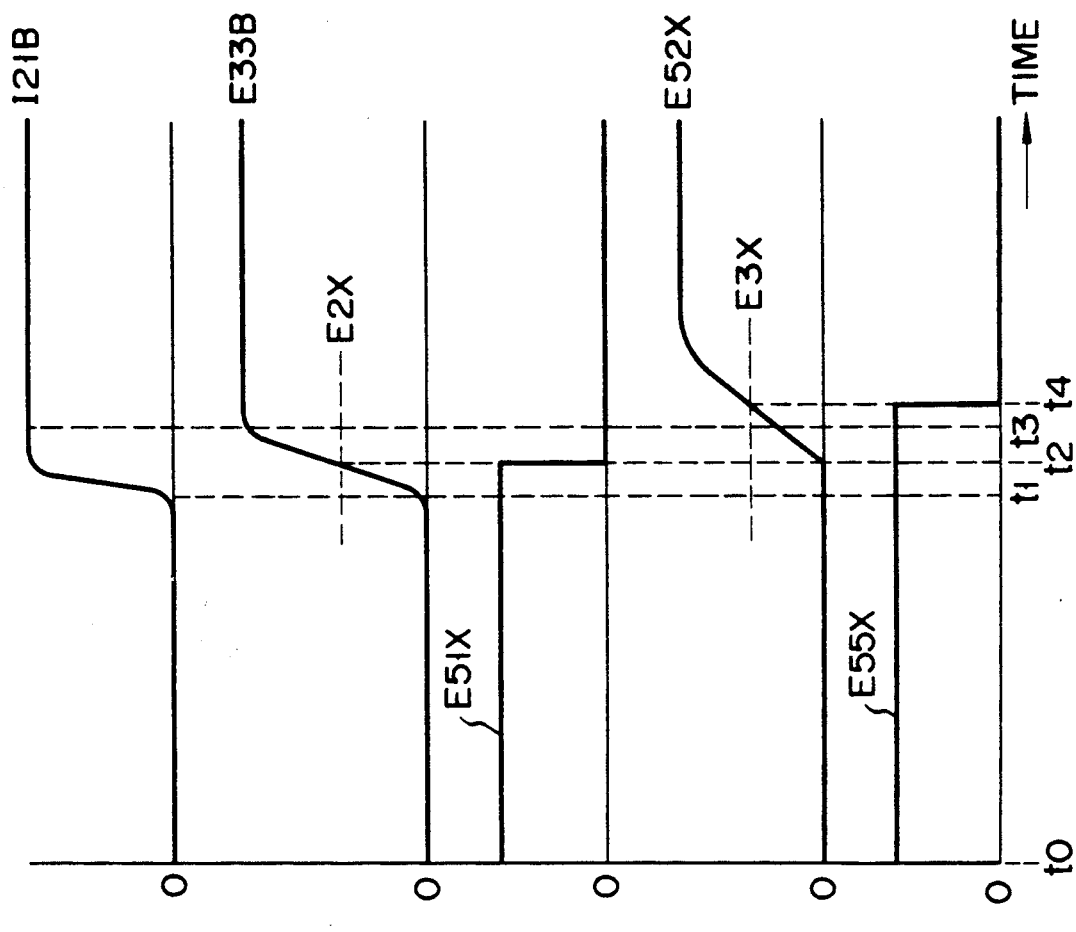
FIG. 6 are timing charts explaining the operation of the embodiment shown in FIGS. 4 and 5.

FIG. 5 is a circuit diagram showing the detailed arrangement of comparator 51X, switch circuit 52X and comparator 55X. The same reference numerals used in FIG. 5 denote the same elements as in FIG. 4.

Referring to FIG. 5, comparator 51X is formed of a differential amplifier which includes a pair of NPN transistors Q1 and Q2 and a constant current source I1 connected between the circuit-ground and the common emitters of transistors Q1 and Q2. Output E33B from sampling circuit (sample/hold circuit) 33B is supplied to the base of transistor Q1 via a resistor R1. The base of transistor Q2 receives current reference potential E2X from potential source 52. The collector of transistor Q1 is connected via a resistor R2 to voltage source Vcc, and the collector of transistor Q2 is directly connected to voltage source Vcc.

Switch circuit 52X is formed of a differential amplifier which includes a pair of PNP transistors Q3 and Q4 and a constant current source I2 connected between the voltage source Vcc and the common emitters of transistors Q3 and Q4. Output E51X of comparator 51X is obtained from the collector of transistor Q1. Output E51X is supplied to the base of transistor Q3 via a resistor R3. The base of transistor Q4 is connected to a fixed bias source e4. The collector of transistor Q3 is circuit-grounded via a resistor R4 and is connected via resistor 53X to capacitor 54X. Although switch circuit 52X is arranged between resistor 53X and capacitor 54X in FIG. 4, switch circuit 52X may be inserted between resistor 53X and voltage source Vcc as shown in FIG. 5. The circuit arrangement for elements 52X to 54X in FIG. 4 is electrically equivalent to those in FIG. 5.

Comparator 55X is formed of a differential amplifier which includes a pair of NPN transistors Q5 and Q6 and a constant current source I3 connected between the circuit-ground and the common emitters of transistors Q5 and Q6. The base of transistor Q5 is connected via a resistor R5 to the junction between resistor 53X and capacitor 54X. The base of transistor Q6 receives time reference potential E3X from potential source 56X. The collector of transistor Q5 is connected via a resistor R6 to voltage source Vcc, and the collector of transistor Q6 is directly connected to voltage source Vcc. The collector of transistor Q5 provides muting signal E55X. Muting signal E55X is supplied to signal control circuit 57X.

Incidentally, the conductivity type (NPN, PNP) of transistors Q1 to Q6 may be optionally changed according to the actual circuit design.

The operation of the circuit shown in FIG. 5 will now be described with reference to FIGS. 6A to 6E. FIG. 6A shows a change in electron emission (i.e. a change in a cathode current) at cathode I21B of CRT 21; FIG. 6B shows a potential change in output E33B from sampling circuit 33B; FIG. 6C shows a potential change in output E51X (detection signal) from comparator 51X; FIG. 6D shows a potential change in charging voltage E52X (delay signal) of capacitor 54X; and FIG. 6E shows a potential change in output E55X (muting signal) from comparator 55X. Time is plotted along the abscissa in FIGS. 6A to 6E wherein the time of power-on of the television receiver is denoted by t0.

As seen from FIG. 6A, during the initial period after the power-on of the television receiver (t0 to t1), the cathode temperature is low so that substantially no cathode emission is obtained. However, after time t1, electron emission at the cathode starts to increase. Since the potential of output E33B from sampling circuit 33B is proportional to the magnitude of cathode current I21B, the potential change of E33B in FIG. 6B has the same leading edge (at t1) as the current change of I21B in FIG. 6A. Transistors Q1 and Q2 are respectively kept off and on before time t2, and the collector output E51X from transistor Q1 is kept high.

When the potential of output E33B (FIG. 6B) increases so that the base potential of transistor Q1 exceeds the base potential (current reference potential E2X) of transistor Q2 at time t2, transistor Q1 is turned on. Then, collector output E51X from transistor Q1 quickly falls (t2 in FIG. 6C).

Since transistors Q3 and Q4 are respectively kept off and on before time t2, capacitor 54X is in a discharged state. When transistor Q1 is turned on at time t2, the base potential of transistor Q3 in switch circuit 52X quickly falls, and transistors Q3 and Q4 are turned on and off, respectively. Capacitor 54X is then charged by the collector current of transistor Q3 via resistor 53X, and the potential of delay signal E52X rises as shown in FIG. 6D. Since transistors Q5 and Q6 are respectively kept off and on before time t4, muting signal E55X from transistor Q5 is kept high. When capacitor 54X is sufficiently charged so that the potential of delay signal E52X applied to the base of transistor Q5 exceeds time reference potential E3X, collector output E55X (muting signal) from transistor Q5 quickly falls at time t4 in FIG. 6E. (The reason why the signal E52X is labelled with "delay" is that the potential inclination of signal E52X with given reference potential E3X serves to delay the signal edge from E51X at t2 to E55X at t4.)

Output E55X in FIG. 6E is used as the muting signal for signal control circuit 57X. When muting signal E55X is kept high before time t4, video signal E11Y appearing at output terminal 11Y of processing circuit 11 is not supplied to mixer 13. From this, video signal E11Y is temporarily interrupted after the time of power-on (t0 to t4) so that supply of excessive drive voltages to the R, G, and B cathodes of CRT 21 is prevented. Accordingly, the embodiment of the present invention avoids the disadvantage of prior art that the raster of CRT appears with the maximum brightness at the initial period of power-on.

After time t3, the cathode emission of CRT 21 and hence the output from sampling circuit 33B is stabilized, as seen from the illustration of FIGS. 6A and 6B. Then, the color television receiver is set in the normal operation state, thereby properly maintaining the reference white by means of the automatic white control circuit.

In the above embodiment, capacitor 54X is charged with a time constant of its capacitance and the resistance of resistor 53X, and the charged voltage (E52X) is supplied to comparator 55X. Thus, the time constant elements 53X and 54X provides a time delay or time lag (t2 to t4) to muting signal E55X. According to this muting signal, video signal E11Y is interrupted or muted (t0 to t4) until the cathode emission of CRT becomes sufficient and the output from sampling circuit 33B is practically stabilized. The interruption or mute mode is released at time t4, after (t3 in FIG. 6A) the actual stabilization of CRT and other associated circuitries is obtained. Therefore, a stable and high-fidelity color picture is reproduced on CRT 21.

Figure 7:
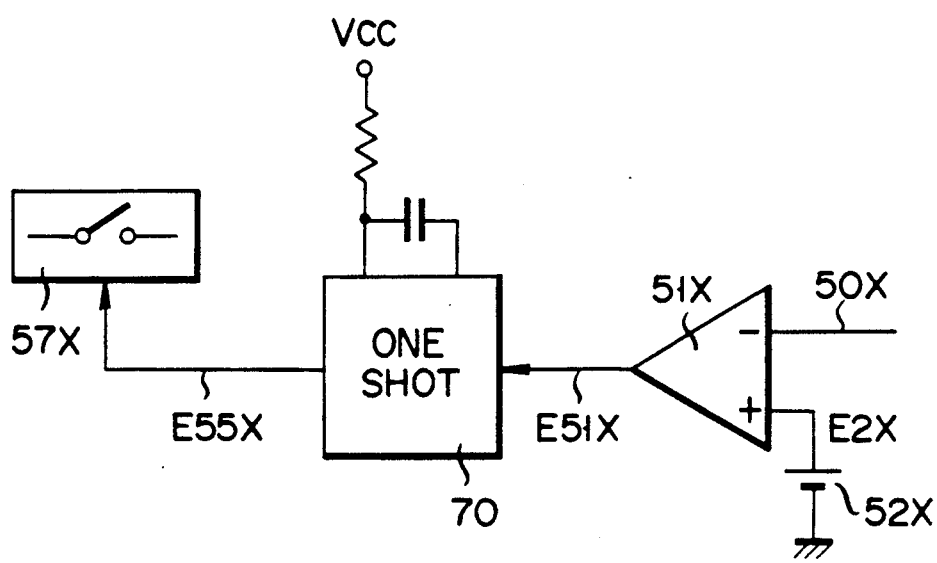
FIG. 7 is another circuit diagram showing the main part of the configuration of FIG. 4.

FIG. 7 shows a modification of the circuit of elements 51X to 57X in FIG. 4. In FIG. 4, a time delay of potential change in the charging operation of CR time constant circuit (52X–54X) and a level detecting operation of level comparator circuit (55X, 56X) are utilized to obtain the time lag between t2 and t4 in FIGS. 6C and 6E. On the contrary, according to the configuration of FIG. 7, a one-shot multivibrator 70 with a proper time constant is utilized to produce a muting signal E55X which involves the above time lag (t2 to t4). One-shot 70 generates muting signal E55X with a high level when inputted trigger signal E51X has a high level (before t2 in FIGS. 6C and 6E). When the level of signal E51X falls (t2 in FIG. 6C), one-shot 70 is triggered so that the level of signal E55X is still at high (t2 in FIG. 6E). When a prescribed period of time corresponding to the time constant of this one-shot has elapsed, the level of signal E55X falls (t4 in FIG. 6E). Thus, the circuit operation of FIG. 7 is the same as that of the corresponding circuit elements in FIG. 4.

Figure 8:
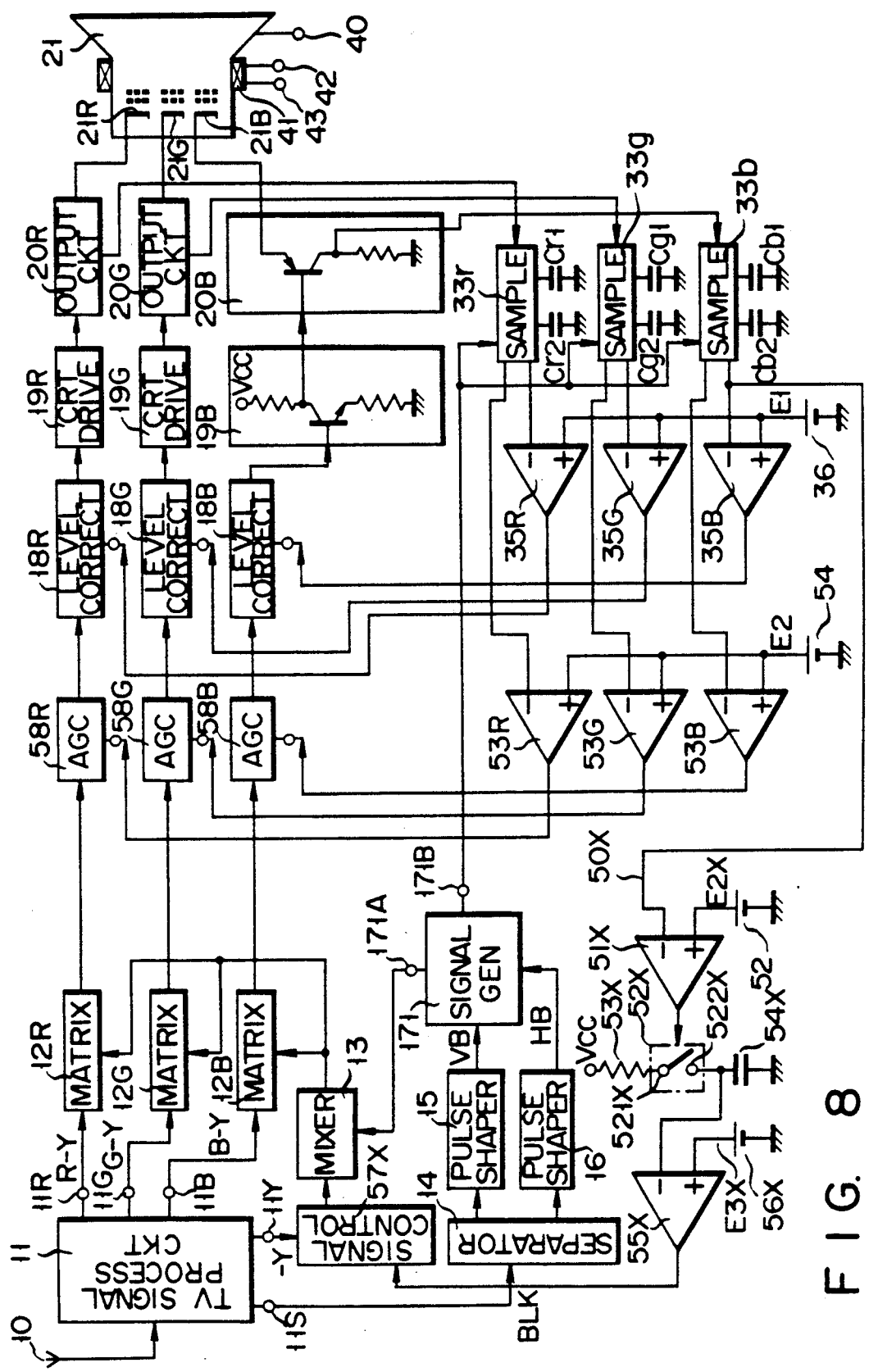
FIG. 8 shows a color television receiver according to another embodiment of the present invention, which corresponds to the combination of the disclosures of Japanese Patent Applications No. 58-124607 and No. 58-124608 (both filed on July 11, 1984).

FIG. 8 shows another embodiment of the present invention. In FIG. 8, the negative feedback loop of elements 18, 19, 20, 33 and 35 serves to automatically control the cut-off DC bias of CRT 21 (DC feedback control). On the other hand, circuit elements 58, 18, 19, 20, 33 and 53 form another negative feedback loop which serves to automatically control the AC driving voltage for CRT 21 (AC feedback control). According to the combination of the above DC and AC feedback controls, adverse effect due to characteristic variations and aging of cathodes of CRT 21, as well as other variations and aging of the associated circuitries, can be avoided. These DC/AC feedback control loops for the color television receiver is disclosed in Japanese Patent Application No. 58-124608 (U.S. patent application Ser. No. 628,985) which was filed by the same applicant as the present application. All disclosures of this Japanese Patent Application No. 58-124608 are incorporated in the present application.

According to the present invention, application of excessive driving to the CRT immediately after the power-on of the color television receiver can be prevented by the special circuit elements (51X to 57X). Since the CRT is protected from intermittent excessive driving at each time of power-on, the service life of the CRT is extended. In addition, a stable picture is reproduced on the CRT after the power-on of television receiver, thereby avoiding discomfort to the viewers. In normal operation, a good reproduced picture free from deviations in reference white can be obtained by the operation of the automatic white control circuit.

The present invention is not limited to the above embodiment. Other changes and modifications may be made without departing from the scope of the present invention defined in the appended claims. For instance, signal control circuit 57X may be inserted in any position between the cathodes (or the control grids as the case may be) of CRT 21 and the television signal processing circuit 11 so as to allow/inhibit the signal transmission of video signal E11Y.

What is claimed is:

1. A color television receiver, having a color CRT which uses at least one cathode to display an image corresponding to a video signal, including a luminance signal, comprising:

current detector means coupled to said cathode of said CRT, for detecting a magnitude of a cathode current which flows through at least one of said cathodes of said CRT, which corresponds to a then existing cathode temperature of said television, and generating a current signal which is indicative of said magnitude of said cathode current;

sample/hold means coupled to said current detector means for sampling said current signal and for holding the sampled current signal to generate a sampled signal;

level correction means coupled to said sample/hold means and said CRT for adjusting a DC bias of said cathode of said CRT based on said sampled signal, so that a cut-off level of said CRT corresponds to a given reference level which is optimized for whiteness control;

cathode current flow detection mans for generating a detection signal when said magnitude of said cathode current exceeds a given value; and interruption means coupled to said detection means for interrupting said luminance signal from being supplied to said CRT, based on said detection signal, thereby interrupting said luminance signal when said magnitude of said CRT current is less than a predetermined value, wherein said interruption means includes:

delay means coupled to said detection means for generating a muting signal for a given period of time after the generation of said detection signal; and muting means, inserted in a signal path of said video signal for interrupting the supply of said luminance signal to said CRt when said muting signal is generated.

2. A color television receiver according to claim 1, wherein said detection means includes;

current comparator means coupled to said sample/hold means and being responsive to a current reference potential, for generating said detection signal when the potential of said sampled signal exceeds said current reference potential.

3. A color television receiver according to claim 1, wherein said delay means includes:

timer means coupled to said detection means for generating a delay signal after the generation of said detection signal, said delay signal having a potential which is varied with time; and muting comparator means coupled to said timer means and being responsive to a time reference potential which defines said given period of time after the generation of said detection signal, for generating said muting signal when the potential of said delay signal exceeds said time reference potential.

4. A color television receiver according to claim 1, wherein said delay means includes:

one-shot means coupled to said detection means and being responsive to the signal edge of said detection signal, for generating said muting signal for said given period of time after said one-shot means is triggered by the signal edge of said detection signal.

5. A color television receiver according to claim 1, further comprising:

gain control means coupled to said sample/hold means and being responsive to a gain reference potential, for automatically controlling a circuit gain of a cathode circuit of said CRT so that this circuit gain is fixed at a value corresponding to said gain reference potential.

6. A color television receiver having a color CRT comprising:

(a) signal processing means responsive to a video signal for generating color signals from said video signal, said signal processing means including means for delivering a luminance signal and a chrominance signal;

(b) means coupled to said signal processing means for transmitting said color signals to said color CRT;

(c) means for inserting a reference pulse signal into a period of said video signal, said period being one during which no video information is transmitted;

(d) detection means for detecting a magnitude of a cathode current of said color CRt and generating a detection signal indicative thereof;

(e) sample/hold means for sampling said detection signal at a given time corresponding to a period during which said reference insertion pulse is inserted, and for holding the sampled value of said detection signal as a sampled detection signal;

(f) level correction means for adjusting a DC bias of said color CRT according to said sampled detection signal; and (g) means for interrupting the transmission of said luminance signal to said color CRT until said sampled detection signal reaches a given level, wherein said interrupting means includes delay means for delaying the releasing time of the interrupting function of said interrupting means for a given period after said sample detection signal reaches said given level.

7. A color television receiver of claim 6, wherein said signal processing means includes:

matrix means for generating said color signals form said luminance and chrominance signals; and means for interrupting the delivering of said luminance signal signals from which a luminance signal can be derived.

8. A color television receiver having a color CRT which uses at least one cathode to display an image corresponding to a video signal which includes a luminance signal comprising:

means for detecting a magnitude of a cathode current which flows through at last one of said cathodes of said CRT and which corresponds to a then existing cathode temperature of the television, and generating a current signal which is indicative of said magnitude of said cathode current;

sample/hold means coupled to said current detecting means for sampling said current signal and for holding the sample current signal to generate a sampled signal;

level correction means coupled to said sample/hold means and said CRT for adjusting a DC bias of said cathode of said CRT so that a cut-off level of said CRT corresponds to a given reference level;

cathode current flow detection means for generating a detection signal when said magnitude of said cathode current exceeds a given value, which includes current comparator means coupled to said sample/hold means and being responsive to a reference signal level, for generating said detection signal when said sampled signal exceeds said reference signal level;

delay means coupled to said detection means for generating a muting signal for a given period of time after the generation of said detection signal; and muting means, inserted in a signal path of said video signal for interrupting said luminance signal such that said signals do not reach said CRT when said muting signal is generated.

9. A method of controlling a color CRT in a color television receiver, comprising the steps of:

continually performing a white control operation in a cathode ray tube, which white control operation ensures maximum stabilization of the color characteristics of the cathode ray tube (CRT);

detecting a magnitude of a current flowing through a cathode of the color television receiver which corresponds to a then existing cathode temperature of said television;

determining if the detected magnitude is above a predetermined threshold, which predetermined threshold indicates a current flow in a cathode of a predetermined temperature;

delaying for a predetermined time after said determining said magnitude above a threshold; and disabling said white control operating by interrupting a luminance signal to said CRT when the detected magnitude is below the predetermined threshold until said delaying step is completed.

* * * * *